UNITED STATES PATENT OFFICE.

JOSEPH NUSBAUM, OF PHILADELPHIA, PENNSYLVANIA, ASSIGNOR TO P. E. SHARPLESS COMPANY, OF PHILADELPHIA, PENNSYLVANIA, A CORPORATION OF PENNSYLVANIA.

PROCESS OF MAKING SOFT CHEESE AND THE PRODUCT THEREOF.

1,258,438. Specification of Letters Patent. Patented Mar. 5, 1918.

No Drawing. Application filed May 22, 1917. Serial No. 170,126.

*To all whom it may concern:*

Be it known that I, JOSEPH NUSBAUM, a citizen of the United States, and a resident of Philadelphia, county of Philadelphia, and State of Pennsylvania, have invented a certain new and useful Improvement in Processes of Making Soft Cheese and the Product Thereof, of which the following is a specification.

My invention relates to the production of a new variety of soft or uncured cheese, and it results in a new composition of matter having for its principal objects to impart to the composition the characteristic flavor of the well known Roquefort cheese combined with and modified by that of commercial soft or uncured cream cheese made usually from unskimmed milk, while retaining the characteristic physical and other inherent qualities which identify the latter; and to these ends my new composition of matter consists of the elements hereinafter stated, combined in the manner and substantially in the proportions hereinafter set forth; my invention however comprising not only the new product as such, but the process or method of producing the same.

As the process of making soft cream cheese from whole or unskimmed milk, whether with or without the addition thereto of cream to increase its butter fat constituent, and the characteristics of the product are each well known in the art, it is unnecessary to describe the same. Equally so are the characteristics, both physically and as to flavor, of Roquefort cheese, which, as well known, is a species of cured cheese having a tendency to become comparatively hard though friable when dried.

To unite these two radically different products, so as to produce not merely an aggregated mass, which would be useless and inconsistent because of their different physical and other characteristics, but to so combine them as to produce a homogeneous mass wherein the physical character of the cured element is wholly changed while imparting its peculiar flavor to the resultant mass, and this without any objectionable effect on the other element as a soft cheese, is what I have accomplished by the following means or method.

Beginning with any variety of soft-cheese, which is classified as cream cheese because made from whole or unskimmed milk and hence containing not less than twenty per cent. of butter fat, but which I prefer to make in the best commercial form by the addition of sufficient cream to increase its butter fat constituent to a percentage varying from 30 to 40 per cent., I make my new composition of approximately eight-ninths parts thereof and approximately one-ninth part of standard commercial Roquefort cheese. Allowing the latter to become sufficiently dried to be friable and crumble readily, I comminute it to practically pulverization, which may be done by any convenient and known means. Then placing the soft cream cheese element, in substantially the proportion stated, in a revolving-blade mixer, commonly used in certain branches of this art, or other equivalent mixing device, the other one-ninth part of the intended resultant composition, consisting of the comminuted Roquefort cheese, is then gradually added, as the mixer blades revolve, but in small quantities, and from time to time, so as to insure the soft cheese taking it up and thereby effecting a complete blending of said constituent elements.

This step in the process is apt to impart high temperature to the mass, and a partly consequent reduction in density; in consequence whereof I allow the amalgamated mass to cool sufficient to restore its normal temperature and density; and then, if the resultant composition shows any signs of not being perfectly smooth, the last described step of the process of blending above described is repeated either in the same machine or preferably in any suitable and known form of grinding machine adapted to be used for the purpose of reducing any lumpy particles in a composition of matter of like character.

A cooling, after this step, if taken and if found necessary to restore the normal temperature and normal density of the mass, results in a composition sufficiently hard to be molded into small cylinders or rectangular cakes, and has the identifying characteristics of a homogeneous composition wherein the cured element, the Roquefort cheese, has not only lost its physical characteristics as such, but has imparted such part of that quality to the resultant composition as to increase the keeping qualities thereof; but also primarily and in a marked degree, to impart its well known flavor thereto, and this without wholly depriving the other element of the composition of its physical and other characteristics of a soft cream cheese capable of being molded into known commercial forms thereof, and usually wrapped in tin foil for such purpose.

Having thus described my invention, I claim:

1. The process described of producing a homogeneous composite of soft uncured cream cheese and cured Roquefort cheese, which primarily consists in combining approximately eight parts by weight of the former with approximately one part by weight of the latter previously reduced to dried and substantially pulverized condition, and blending the elements of the mass under movable contact in a suitable mixing machine.

2. The process described of producing a homogeneous composite of soft uncured cream cheese and cured Roquefort cheese, which consists in adding approximately one part of dried and substantially pulverized Roquefort cheese in small quantities, from time to time, to approximately eight parts of soft uncured cream cheese, during combination of the elements of the mass under suitable mechanical admixture; then restoring the normal temperature and density of the resultant mass, by cooling, and finally molding the same into commercial form; substantially as described.

3. The product of the process described which is a homogeneous composite of approximately eight parts by weight of uncured cream cheese of commerce, with approximately one part by weight, of dried and pulverized Roquefort cheese of commerce, which have been blended under revoluble mechanical contact and then cooled and molded into commercial form.

4. The product of the process described which is a homogeneous composite of uncured soft cheese of commerce made from milk and a flavoring element consisting of dried, pulverized Roquefort cheese of commerce, said elements having been blended and combined under revoluble contact and molded into commercial form.

5. A product of the character set forth which is a homogeneous composite of an uncured cheese of commerce and a flavoring element incorporated therein, consisting of Roquefort cheese blended and combined therewith into a suitable commercial form.

In witness whereof, I have hereunto set my hand this 21st day of May, A. D., 1917,

JOSEPH NUSBAUM.